United States Patent [19]
Downing et al.

[11] 3,905,241
[45] Sept. 16, 1975

[54] ELECTRICAL PRIMARY FLIGHT CONTROL SYSTEM

[75] Inventors: James W. Downing, Buena Park; Carlos P. Fernandez, Westminster; Vernon C. Sethre, Santa Ana, all of Calif.

[73] Assignee: McDonnell Douglas Corporation, Santa Monica, Calif.

[22] Filed: Oct. 29, 1973

[21] Appl. No.: 410,535

[52] U.S. Cl................. 74/470; 244/75 R; 244/78
[51] Int. Cl.².................... B64C 13/40; G05G 1/00
[58] Field of Search...... 244/77 V, 78, 83 E, , 75 R, 244/83 R, 85; 91/361, 363 A, 363 R, 1, 411; 74/470–471 R; 318/564, 563

[56] References Cited
UNITED STATES PATENTS

| | | | |
|---|---|---|---|
| 2,826,896 | 3/1958 | Glaze et al. | 244/83 E |
| 3,095,783 | 7/1963 | Flindt | 91/363 A |
| 3,136,504 | 6/1964 | Carr | 244/78 |
| 3,198,082 | 8/1965 | Kerris | 74/470 |
| 3,286,600 | 11/1966 | Colburn | 244/83 E |
| 3,478,990 | 11/1969 | Kaniuka | 244/78 |
| 3,608,430 | 9/1971 | Headlund et al. | 91/1 |
| 3,633,435 | 1/1972 | Farr | 74/470 |

FOREIGN PATENTS OR APPLICATIONS
896,018   2/1945   France ............... 244/83 E

*Primary Examiner*—Trygve M. Blix
*Assistant Examiner*—Galen L. Barefoot
*Attorney, Agent, or Firm*—G. W. Finch; W. J. Jason; D. L. Royer

[57] ABSTRACT

An electric flight control system including three or more flight command signal transmission channels, a channel signal discriminator, and a flight control surface actuator. The system converts a mechanical input signal into several nominally identical electric signals, transmits the signals through electrically independent channels, and reconverts the several signals into a single mechanical output signal essentially proportional to the mechanical output signal essentially proportional to the mechanical input signal. In a three-channel or a four-channel system, the discriminator prevents a malfunction of any one channel from causing the mechanical output signal to depart from essential proportionality to the input signal. In a five-channel system malfunctions of any two channels are prevented from causing departure from signal proportionality.

2 Claims, 3 Drawing Figures

ELECTRICAL PRIMARY FLIGHT CONTROL SYSTEM

BACKGROUND OF THE INVENTION

Electrically controlled primary flight control systems have advantages over mechanically controlled systems in some types of aircraft. The performance of purely mechanical flight command signal transmission systems is limited by the effects of mass, friction, looseness, and compliance of mechanical parts. Mechanical systems for transmission of flight command signals through cargo spaces and around movable parts of aircraft structure are difficult to design and costly to fabricate. In large aircraft, weight, space, and the effects of dimensional changes in aircraft structure and control system parts are excessive for purely mechanical systems. Also, the transferring of flight command signals from an automatic flight control system into a pure mechanical flight control system requires electric-to-mechanical signal conversion. The disadvantages of purely mechanical systems are eliminated or lessened in electric flight command signal transmission systems. The principle disadvantage to be overcome in electric systems is the relatively higher probability of occurrence of malfunctions in the electrical devices comprising the system. Because of this high failure rate the use of electrical devices has been restricted to flight automatic and secondary flight control systems which may be disengaged during flight without endangering the aircraft.

To the present time, various schemes have been proposed to reduce or eliminate the effects of failures of parts of electrical control systems by providing redundant parts to perform the functions which the failed parts performed prior to failure. These proposed schemes require complex monitoring and switchover systems which prevent achievement of operational reliability sufficiently high to permit their use in primary flight control systems.

SUMMARY OF THE INVENTION

The present system is comprised of three or more electrical flight command signal transmission channels with each channel being as electrically independent as possible such as being powered by separate batteries. The input to each of the channels is one of nominally identical electrical voltages generated by control stick position transmitters. Each of the stick position signal voltages is differenced with signal voltages fed back from the output of the same channel. The resulting channel error signal voltages are amplified, demodulated and converted into currents proportional to the signal voltages which in turn are fed to a servo whose output displacement is proportional thereto. The direction of movement of the servo is orientated to drive the channel error signal to zero. Thus each of the five channels is a closed loop servomechanism, the output of which is a mechanical displacement corresponding to the displacement of the control stick.

The servos of the channels move independently of each other. When all channels are functioning normally, disagreements in position among the channels are caused by the tolerances in the gain of the components in cascade in each channel. When one or more channels are functioning abnormally, the disagreement in position of the several outputs may become as great as "hard-over."

The conversion of the mechanical outputs of the servos of the channels into one mechanical signal is accomplished in a channel discriminator. The channel discriminator compares the mechanical outputs of the channels, discriminates against the output or outputs which do not fall within the limits of an arbitrary band and produces a signal output that is a function of the mechanical outputs that fall within the band limits. The signal output of the channel discriminator is fed to the control surface either directly or through suitable force amplification means such as a conventional hydraulic control surface actuator.

The present invention, due to its redundant nature, which unlike the prior art systems utilizes more than one channel at a time to control the aircraft, is inherently of higher performance than prior art fly-by-wire systems and can be constructed with a reliability approaching that of conventional mechanical control systems.

It is therefore an object of the present invention to provide an electrical primary flight control system for an aircraft whose reliability approaches that of conventional mechanical control systems.

Another object is to eliminate the need for monitoring and switchover systems in fly-by-wire flight control systems.

Another object of the present invention is to provide a fly-by-wire system whose performance is better than conventional mechanical control systems.

Another object is to provide a fly-by-wire system which can be constructed relatively economically.

Another object is to provide a fly-by-wire system which can be maintained by experienced aircraft mechanics without special training.

These and other objects and advantages of the present invention will become apparent after considering the following detailed specification which covers a preferred embodiment thereof in connection with the accompanying drawings wherein:

DETAILED DESCRIPTION OF THE SHOWN EMBODIMENTS

Figure 1:
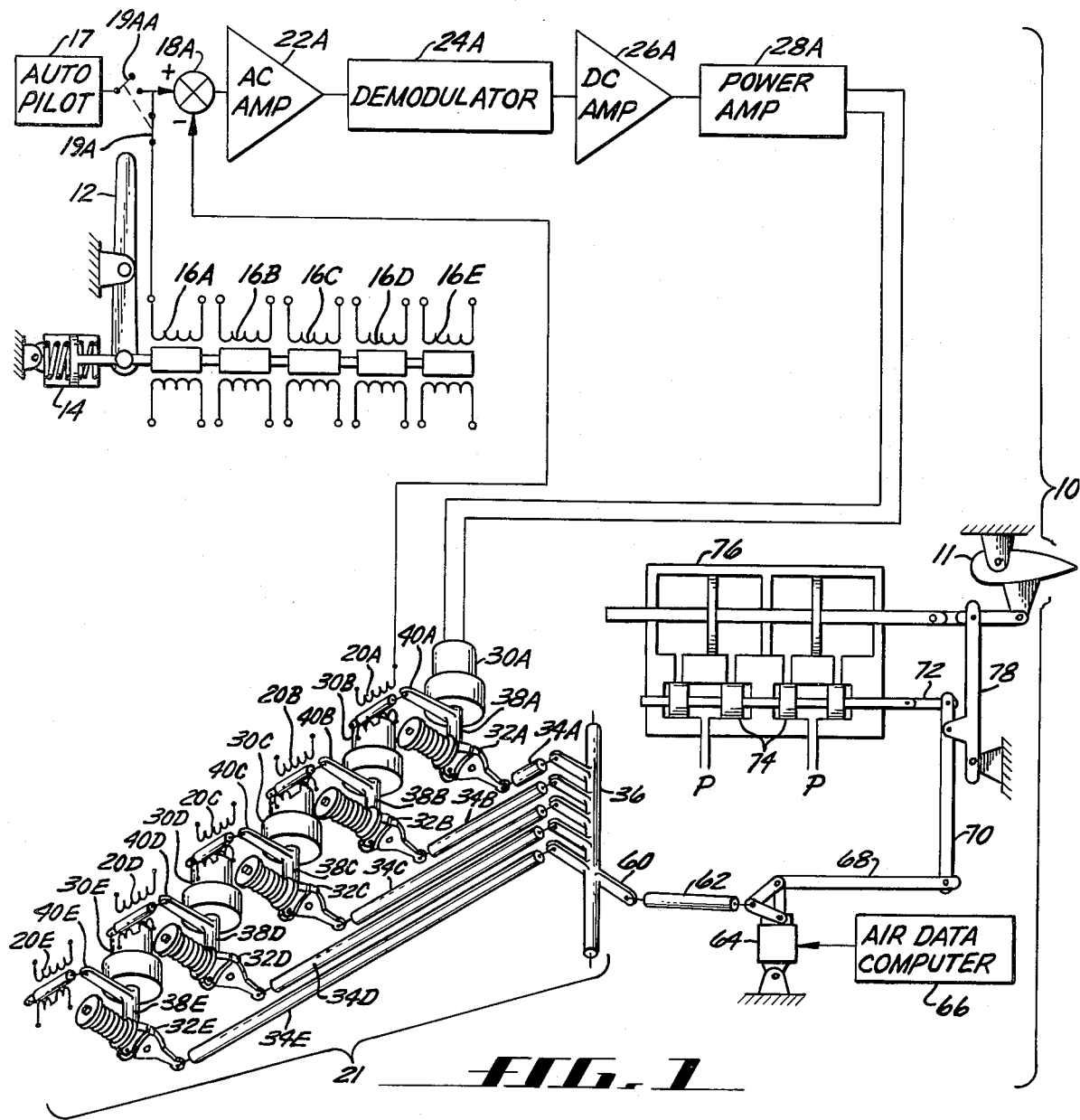
FIG. 1 is a diagrammatic representation of the electrical primary flight control system of the present invention with discrimination in the control loop.

Referring to the drawings more particularly by reference numbers, number 10 in FIG. 1 refers to a five channel electrical primary flight control system for an aircraft with Channel A thereof shown in detail. The system 10 is arbitrarily chosen as a system for control of an aircraft elevator 11. The system 10 is connected to the control stick 12 and its associated load feel device 14 by means of position transducers 16A, 16B, 16C, 16D and 16E which are shown as alternating current position transducers. Looking at Channel A, the command output from the position transducer 16A or alternatively an autopilot 17, is fed to a summer 18A by cooperating switches 19A and 19AA. In the summer 18A, the command output is differenced with a signal from an output position transducer 20A which is part of a channel discriminator 21 also including position transducers 20B, 20C, 20D and 20E for the other channels. The position transducers 20A, 20B, 20C, 20D and 20E can be similar to position transducers 16A through 16E. The output of the summer 18A which is the error between the input and the output of Channel A is fed to an AC amplifier 22A whose output is converted from AC to DC in a demodulator 24A and then fed to a DC amplifier 26A and a power amplifier 28A where the level thereof is boosted to power a servo motor 30A. The error voltage output of the summer 18A is therefore used to power the servo motor 30A until the motor 30A has moved the connected position transducer 20A far enough to produce a signal in agreement with the signal produced by the control stick position transducer 16A.

The channel discriminator 21 includes a group of discriminator elements 32A, 32B, 32C, 32D and 32E driven by servo motors 30A, 30B, 30C, 30D and 30E. The discriminator elements 32A through 32E are connected by rods 34A, 34B, 34C, 34D and 34E to a common output shaft 36 in such a way that all the output torques of the discriminator elements 32A through 32E are summed at the common output shaft 36.

Figure 2:
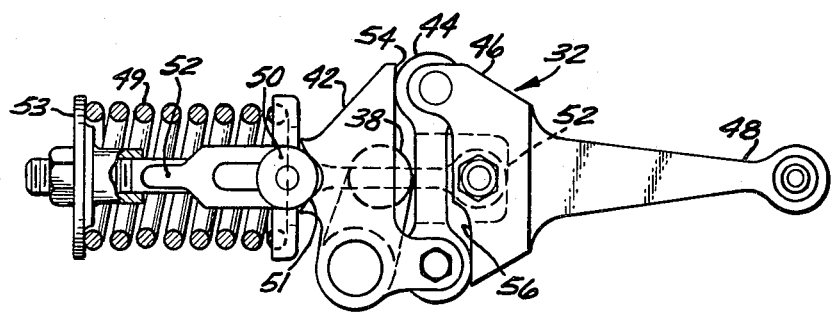
FIG. 2 is an enlarged side view of a channel discriminator element used in the channel discriminator of the present system.

A discriminator element 32 is shown in FIG. 2. It is an adaptation of the bidirectional force override disclosed in U.S. Pat. No. 3,633,435. The discriminator elements 32A through 32E are attached to the output shafts 38A through 38E of the servo motors 30A through 30E, respectively, which are shown in FIG. 1. The servo motors also drive the position transducers 20A through 20E by means of extension arms 40A, 40B, 40C, 40D and 40E, respectively. The output shaft 38 of a servo motor 30A, 30B, 30C, 30D or 30E, transfers the torque of the servo motor to the input member 42 of the discriminator element 32. The member 42 is pivotally connected to one end of a connecting link 44 whose other end is connected to an output member 46. The output member 46 has an output arm 48 adapted for connection to the rods 34A, 34B, 34C, 34D or 34E, as shown in FIG. 1.

The input member 42 and the output member 46 are biased toward each other by a caged spring 49 which applies the force to the input member 42 by means of a roller 50 which rests in an indentation 51 in the input member 42. The spring 49 applies force to the output member 46 by means of a rod 52 which extends from the outer end 53 of the spring 49 through member 42 and link 44 to the output member 46. The caged spring 49 is preloaded to maintain the discriminator element 32 in a rigid condition with an abutment surface 54 of the input member 42 and an abutment surface 56 of the output member 46 in contact with the link 44. The characteristics of the discriminator element 32 are such that when a predetermined breakout torque is applied between the shaft 38 and the output arm 48, the spring 49 is further compressed and the element 32 no longer acts like a rigid assembly. This breakout torque reaches a maximum value with relatively little movement between the shaft 38 and the arm 48 and then remains substantially constant regardless of further relative motion in the same direction between the shaft 38 and the arm 48. All the discriminator elements 32A through 32E are adjusted to a nominally identical breakout torque level by adjusting the preload of the spring 49.

Disregarding the possibility of coincidence, it can be assumed that no two channel outputs in the form of displacements of the servo motor output shafts 38A, 38B 38C, 38D and 38E are exactly the same. Therefore the rotational position of output shaft 36 can be expected to agree with only one of the shafts 38A, 38B, 38C, 38D or 38E. The channels whose outputs do not agree with the output shaft 36 develop a torque with respect to the shaft 36. The senses of each of these torques are in directions that try to move the output shaft 36 to agree with the position of the channels. If the shaft 36 does not move and no aforementioned arbitrary band is assumed, the torques increase in the not-in-agreement channels until they reach the breakout torque of the respective discriminator element 32. At this point the torque remains constant regardless of how much more the particular channel's output moves. Consequently every channel that does not agree with the output shaft position develops a torque equal to the breakout torque. It should be noted that each torque has a tendency to rotate the output shaft 36 in a direction such that the disagreement between the channel position and the shaft position disappears.

The output shaft 36 moves until it reaches a position where the summation of all the torques applied to the output shaft 36 is zero. If the number of channels is an odd number, there will be the same number of channels with a positive torque as channels with a negative torque. The remaining channel will agree in position with the output shaft and its torque with respect to the shaft will be essentially zero. If the number of input channels is even and an equilibrium condition is reached, there will be an equal number of positive and negative channels and no single channel will exactly agree with the position of the shaft 36. This case is operative but it presents an undefined output. It should be noted that only an odd number of inputs will actually define the output. When a channel is not controlling the position of the output shaft 36, it has no more influence in positioning the output shaft 36 than a failed hardover channel because both channels have the same torque developed with respect to the output shaft 36. Therefore, it can be seen that only one channel defines the position of the output shaft and the others remain idling.

In order to permit more than one channel to contribute to the determination of the position of the output shaft 36, it is necessary to permit more than one channel to control the output shaft 36 at the same time. This is done by designing the discriminator elements 32A, 32B, 32C, 32D and 32E to allow some displacement between the input member 42 and the output arm 48 thereof before the breakout torque occurs. This means that in each channel the torque will increase as the channel input moves to either side of the position of shaft 36. If no channel reaches the breakout torque, all the channels contribute to the determination of the position of the output shaft 36. Therefore, the amount of relative displacement allowed between the input member 72 and the output arm 48 before the breakout torque is applied defines the arbitrary band in which each channel can contribute to the position of the output shaft 36. If any channel, A, B, C, D or E, goes hardover or into its override condition, its influence in the determination of the position of the output shaft 36 is limited to the displacement required to reach the breakout torque. Any displacement beyond this point does not change the position of the output shaft 36 because the torque applied to the shaft 36 by the channel cannot further increase.

If two or any multiple of two channels go hardover in different directions, the position output shaft 36 is not affected because the torques that the elements 32 develop will be equal in magnitude and opposite in direction, cancelling each other by pairs. If two or more channels go hardover in the same direction, the system 10 is still operable so long as less than half of the total number of channels go hardover in the same direction. In this latter case, the position of the output shaft 36 will not be affected by more than the displacement required by any channel to reach the breakout torque condition.

The rotational position of the output shaft 36 is used to control the position of the elevator 11 by any suitable means. In FIG. 1 the rotational position of the shaft 36 is fed by means of an arm 60 connected thereto and a rod 62 to a ratio changer 64 controlled by an air data computer 66. The ratio changer 64 adjusts the displacement of the elevator 11 with respect to displacement of the pilot's control 12 depending on the dynamic conditions of the aircraft as sensed by the air data computer 66. From the ratio changer 64, the control motion is fed by means of a link 68, a lever 70 and a link 72 to the control valves 74 of a hydraulic actuator 76. The hydraulic actuator 76 is connected to the elevator 11 and powers it to move to the position commanded by the autopilot 17 or the control stick 12. The new position of the elevator 11 is sensed by a feedback lever 78 which is pivotally connected to the lever 70 to neutralize the control valves 74 when the position of the elevator 11 commanded is obtained.

Figure 3:
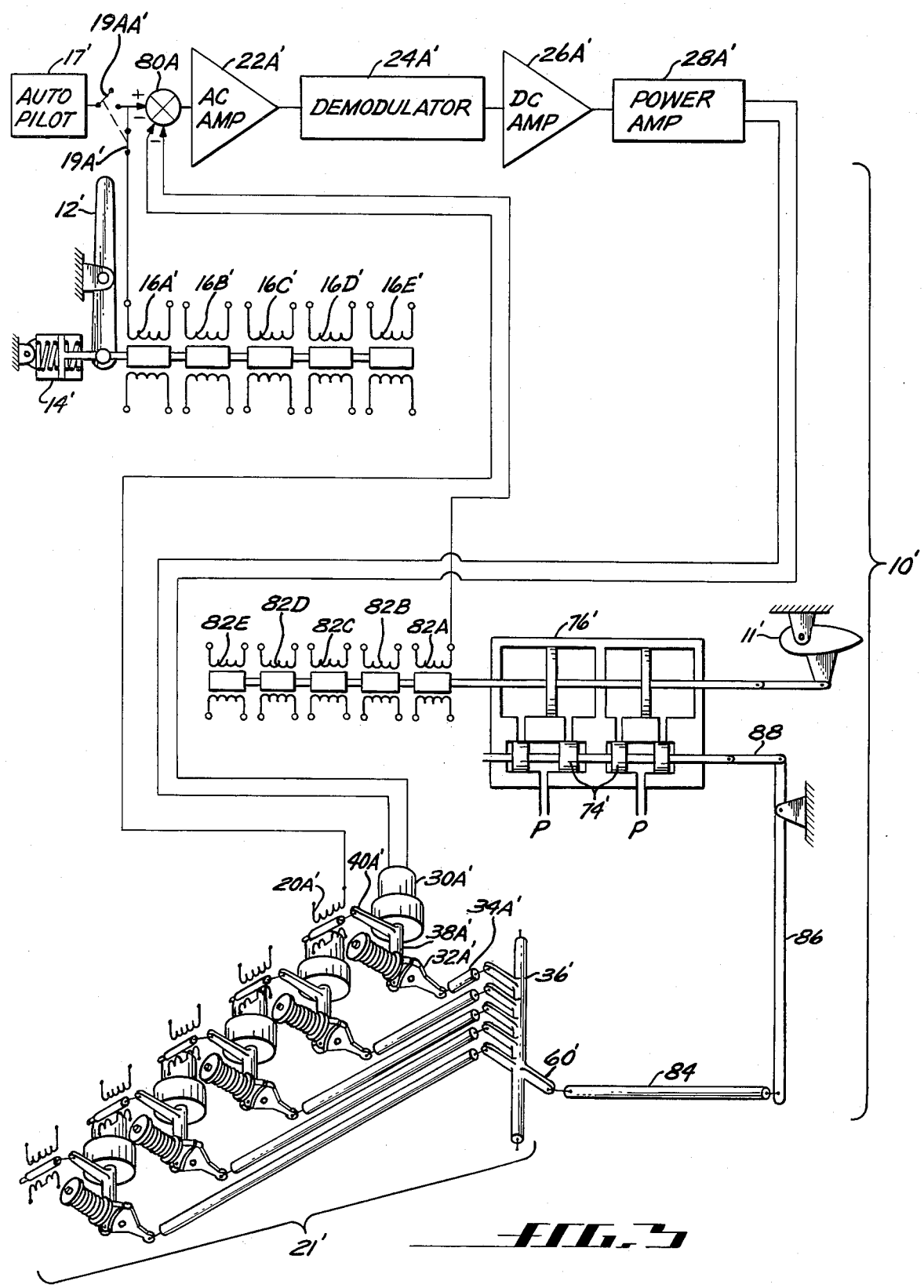
FIG. 3 is a diagrammatic representation of the electrical primary flight control system of the present invention with discrimination in the error loop.

The above describes a system using command signal discrimination where the lever 78 is used to mechanically feed back the error signal between the actuator position and the commanded position. FIG. 3 discloses a similar system 10' which has electrical feedback and error discrimination. The portions of FIG. 3 which correspond to similar portions in FIG. 1 are similarly numbered with a prime (') added thereto.

In FIG. 3, the system 10' is connected to the control stick 12' and its associated load feel device 14' by means of position transducers 16A', 16B', 16C', 16D', and 16E'. Looking at channel A for an example of all the channels, the command output from the position transducer 16A' or alternatively an autopilot 17', is fed to a summer 80. In the summer 80 the command output is differenced with a signal from an output position transducer 20A'. The transducer 20A' is part of the channel discriminator 21' which also includes position transducers 20B', 20C', 20D', and 20E' for the other channels. A signal is also fed to summer 80A from an actuator output transducer 82A which is connected to the output of the actuator 76' as are position transducers 82B, 82C, 82D and 82E. The combined signal out of the summer 80A is then passed through an AC amplifier 22A', a demodulator 24A', a DC amplifier 26A' and a power amplifier 28A' to drive the servo motor 30A' to a position in agreement with the other inputs to the summer 80A. All five channels of the discriminator 21' act simultaneously in a similar manner to produce a displacement output at arm 60' while using torque as the discriminated parameter. The mechanical output of the arm 60' is fed to a rod 84, lever 86 and link 88 to drive the control valves 74' of the hydraulic actuator 76'. The control valves 74' move to allow fluid to drive the actuator output, and in this example the associated elevator 11', to the new commanded position. As the elevator 11' approaches the commanded position, the actuator output transducers like 82A, feed a signal indicative of such back to the summer 80A which responds thereto to send signals to the associated servo motor 30A' which, along with the other channels, causes the discriminator 21' to return the control valves 74' to a position to stop flow of hydraulic fluid and therefore stop the actuator 76' in the desired commanded position.

Therefore it can be seen that the discriminator 21 or 21' can be used for command signal discrimination or for error signal discrimination. The discriminators 21 and 21' both use a parameter pair where one parameter, in the present examples displacement, is used to drive the control system while the other parameter, force is the discriminated parameter. Other natural pairs of parameters can also be used. However, it is felt that the mechanical discriminators 20 and 21' disclosed, utilizing displacement and force present reliability advantages that other types of systems, such as hydraulic systems using flow rate and pressure, electrical systems using voltage and current and other similar systems do not have.

Therefore there has been shown and described novel primary electrical flight control systems utilizing parameter pair discriminators which fulfill all the objects and advantages sought therefor. Many changes, alterations, modifications and other uses and applications of the subject system will become apparent to those skilled in the art after considering this specification and the accompanying drawings. All such changes, alterations and modifications which do not depart from the spirit and scope of the invention are deemed to be covered by the invention which is limited only by the claims which follow.

What is claimed is:

1. A control system for transmitting position information including:

means for producing at least three mechanical outputs representative of the position information;

discriminator elements connected to receive said mechanical outputs and to produce outputs therefrom, said elements each including an input member, an output member, a link pivotally connecting said input and output members, and means for applying force between said input and output members across said connecting link, said last named means including a spring, a cage for said spring having first and second ends, and a rod connecting said first cage end to one of said members, said second cage end being in abutment with the other member to maintain said spring in compression; and discriminator elements output means connected mechanically to move with the outputs of said discriminator elements to produce a system output representing the position information, said discriminator elements being constructed so the input and output position thereof is in general correspondence as long as the force thereacross is in a predetermined band, when said force exceeds said predetermined band, the input and output position thereof no longer being in general correspondence and the force thereacross being nominally constant.

2. The control system defined in claim 1 wherein said rod adjustably connects to said first cage end so that the compression of said spring can be adjusted.

* * * * *